F. J. COOPER.
ARTIFICIAL FLY ENVELOP.
APPLICATION FILED JUNE 30, 1908.

915,557.

Patented Mar. 16, 1909.

WITNESSES.
Arthur L. Slee.
S. Constine

INVENTOR.
Frank J. Cooper
by Wm. F. Booth
his Attorney

UNITED STATES PATENT OFFICE.

FRANK J. COOPER, OF SAN FRANCISCO, CALIFORNIA.

ARTIFICIAL-FLY ENVELOP.

No. 915,557.  Specification of Letters Patent.  Patented March 16, 1909.

Application filed June 30, 1908. Serial No. 441,115.

*To all whom it may concern:*

Be it known that I, FRANK J. COOPER, a citizen of the United States, residing in the city and county of San Francisco and State of California, have invented certain new and useful Improvements in Artificial-Fly Envelops, of which the following is a specification.

Figure 1:
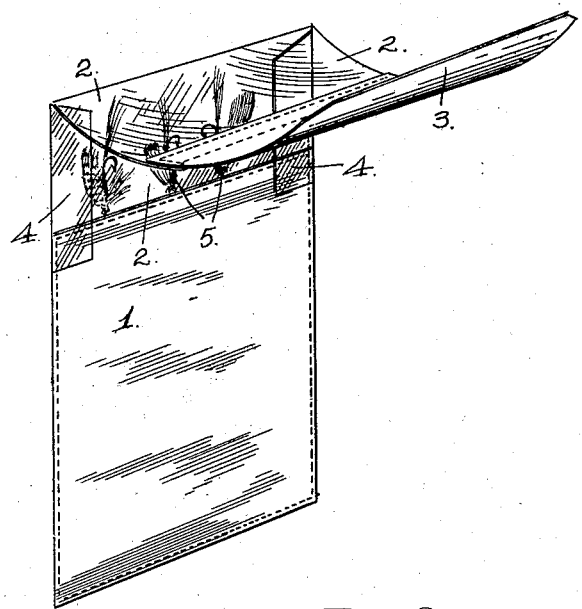
Figure 2:
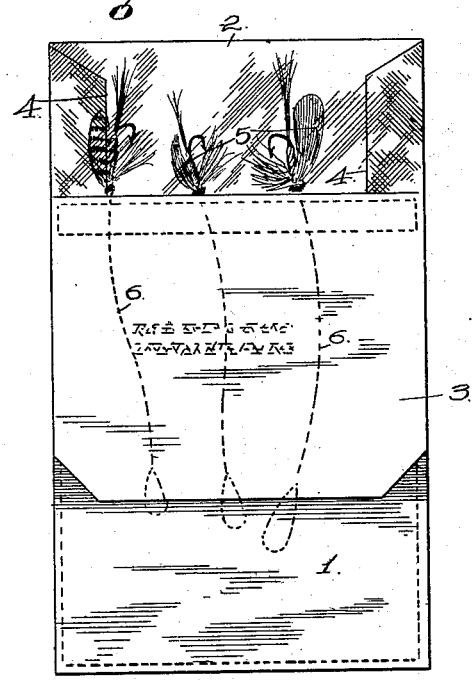
Figure 3:

My invention relates to that class of envelops especially adapted for holding such fishing tackle or appliances as artificial flies, in which is provided a transparent section, through which the flies may be observed, thereby affording opportunity for ready selection. In this class of envelops, the whole object is not subserved by the presence of a transparent portion alone, but regard must be had for such disposition of it, that, in conjunction with the body of the envelop, the flies will be confined well in place, be protected fully while confined, and be easy of access, all in addition to the fact that they are in full view through the transparent section, in order to afford ready selection. These are the objects of my invention, and to these ends it consists in the novel construction, particularly with regard to its arrangement of the transparent section, of the artificial fly envelop, which I shall now fully describe by reference to the accompanying drawings in which:

Figure 1 is a perspective view of my envelop, showing its flap partly open. Fig. 2 is a front view of the envelop, showing its flap closed. Fig. 3 is a back view of the envelop.

The main body 1 of the envelop may be made of any suitable material. I prefer tracing-linen as this is strong, light, durable and attractive. This main body is simply a casing open at one end, and of a depth and width to conveniently receive the snells of the flies. To the open end of this casing, along the back edge thereof, is properly secured, as by stitching, or otherwise, one end of the transparent section 2, which completes the length of the envelop, forming its upper end portion. This section is folded transversely of its middle and thus forms the complete upper end of the envelop, which end is thus transparent both back and front. To the edge of the front of this transparent section 2, is secured, in any suitable manner, as, for example, by stitching, the flap 3 of the envelop. This flap well overlaps the front of the main body and is best made of the same material, preferably tracing-linen, which affords opportunity for writing thereon the name or names of the flies contained in the envelop.

The transparent section 2 may be made of any suitable material. I prefer celluloid. Its back portion, along its sides is formed with relatively narrow wings 4, which, folding inwardly, between the back and front portions form side guards to properly confine the flies in place, preventing them from working out sidewise, and also serving as valves to better protect and preserve the flies.

5 indicates the flies, and 6 their snells. The latter lie within the body 1 of the envelop, while the flies lie between the folds of the transparent section 2, and can be seen from both front and back.

By this arrangement and construction of the transparent section, forming, as it does, an appreciable portion of the length of the envelop, provision is thus made, not only for observing the flies from both sides, but for so fully opening the envelop itself by throwing back its flap, (which turns or bends in a sort of gentle curve throughout its own length as well as in that of the front of the celluloid section, thereby avoiding any weakening of the hinge fold of the latter) that the mouth of the envelop is comparatively low down and gives perfect freedom to reach the exposed flies, withdraw their snells, and to return them to place again with facility. In other words, the envelop, opening as it does, fully exposes the flies, which can at once be reached and withdrawn, without having to feel for them, down into the envelop.

Having thus described my invention, what I claim as new and desire to secure by Letters Patent is:—

1. An envelop of the described class, comprising a body portion open at one of its borders, and a transparent section secured at one edge to the back edge of the body portion, and folded on itself to form both a back and front extension of said body portion, the edge of the front of said transparent section being free of the body portion.

2. An envelop of the described class, comprising a body portion open at one of its borders, a transparent section secured at one edge to the back edge of the body portion and folded on itself to form both a back and front extension of said body portion, and a flap secured to the free front edge of the transparent section and overlapping the front of the body portion.

3. An envelop of the described class, comprising a body portion open at one of its borders, and a transparent section secured at one edge to the back edge of the body portion, and folded on itself to form both a back and front extension of said body portion, the edge of the front of said transparent section being free of the body portion, and the side edges of the back of said section having inwardly folding wings lying between its back and front portions.

4. An envelop of the described class, comprising a body portion open at one of its borders, a transparent section secured at one edge to the back edge of the body portion and folded on itself to form both a back and front extension of said body portion, the side edges of the back of said transparent section having inwardly folding wings lying between its back and front, and a flap secured to the free front edge of the transparent section and overlapping the front of the body portion.

In testimony whereof I have signed my name to this specification in the presence of two subscribing witnesses.

FRANK J. COOPER.

Witnesses:
  WM. F. BOOTH,
  D. B. RICHARDS.